United States Patent

Sugano et al.

[11] 4,409,197
[45] Oct. 11, 1983

[54] PROCESS FOR PRODUCING SODIUM PERCARBONATE

[75] Inventors: Junichiro Sugano, Nagoya; Tomoyuki Yui, Yokkaichi; Yoshitugu Minamikawa, Yokkaichi; Tsuneo Fujimoto, Yokkaichi; Minoru Kubota, Yokkaichi, all of Japan

[73] Assignee: Mitsubishi Gas Chemical Company, Inc., Tokyo, Japan

[21] Appl. No.: 315,645

[22] Filed: Oct. 27, 1981

[30] Foreign Application Priority Data

Oct. 27, 1980 [JP] Japan ................ 55-150502

[51] Int. Cl.³ .................. C01B 31/00; C01B 15/30
[52] U.S. Cl. .................. 423/415 P; 423/272; 423/273; 252/186.1
[58] Field of Search ............ 423/272, 273, 415 P; 252/186

[56] References Cited

U.S. PATENT DOCUMENTS

| 3,383,174 | 5/1968 | Carnine ................ 423/273 |
| 3,387,939 | 6/1968 | Reilly et al. .............. 423/273 |
| 3,677,697 | 7/1972 | Yanush ................ 423/415 P |
| 3,701,825 | 10/1972 | Radimer et al. .......... 423/273 |
| 3,903,244 | 9/1975 | Winkley ................ 423/272 |
| 3,925,456 | 12/1975 | Plöger et al. ............ 106/109 |
| 4,051,058 | 9/1977 | Böwing ................ 423/272 |
| 4,059,678 | 11/1977 | Winkley ................ 423/273 |
| 4,070,442 | 1/1978 | Wahs ................ 423/272 |
| 4,117,087 | 9/1978 | Dillenburg et al. ........ 423/415 P |
| 4,304,762 | 12/1981 | Leigh ................ 423/273 |

Primary Examiner—Gary P. Straub
Attorney, Agent, or Firm—Wenderoth, Lind & Ponack

[57] ABSTRACT

A process for producing sodium percarbonate which comprises reacting sodium carbonate with hydrogen peroxide in a working solution of sodium carbonate, hydrogen peroxide and water, said reaction being carried out in the presence of at least one N,N,N',N'-tetra(-phosphonomethyl)diaminoalkane of the following formula

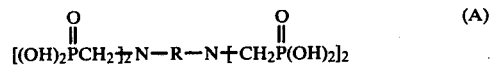

wherein R is either

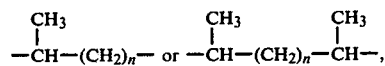

and n is 0 or 1 to 4, and at least one salt selected from the group consisting of phosphates, silicates and magnesium salts.

4 Claims, No Drawings

PROCESS FOR PRODUCING SODIUM PERCARBONATE

This invention relates to a process for economically and efficiently producing sodium percarbonate having high quality and excellent storage stability by reacting sodium carbonate with hydrogen peroxide, and more specifically, to a process wherein the above reaction is carried out in the presence of an N,N,N',N'-tetra(phosphonomethyl)-diaminoalkane having a branched chain as a stabilizer in a working solution.

In the present invention, "sodium percarbonate" denotes a hydrogen peroxide adduct of sodium carbonate, which is represented by the composition formula $2Na_2CO_3 \cdot 3H_2O_2$.

Sodium percarbonate can be easily obtained by reacting sodium carbonate with hydrogen peroxide in an aqueous reaction medium. Industrial sodium carbonate usually contains metals such as Fe, Mn and Cu which accelerate decomposition of hydrogen peroxide. Accordingly, if industrial sodium carbonate is used as the starting material without purification, the loss of hydrogen peroxide in the working solution by decomposition is great. Consequently, the yield of crystals based on hydrogen peroxide is low, and the final product does not have good storage property.

Many attempts have been made in the past to remove these metals from the starting sodium carbonate prior to the reaction and to synthesize sodium percarbonate crystals in good yields. One of these attempts is a process which comprises dissolving sodium carbonate in deionized water, adding magnesium sulfate and sodium silicate, removing metals together with the resulting magnesium silicate by filtration, and feeding the resulting aqueous solution of purified sodium carbonate into the reaction system; or providing a purifying step in the process of continuous manufacture of sodium percarbonate, adding required amounts of sodium carbonate and water to the filtrate resulting from separation of sodium percarbonate by filtration, removing transition metals in the same way as above, and feeding the resulting aqueous solution of purified sodium carbonate again into the reaction system. According to this process, metals which may accelerate decomposition of hydrogen peroxide can be removed relatively easily. However, as a result of this procedure, a large excess of water remains in the reaction system, and the amount of sodium percarbonate dissolved in the excess water is extremely large. Consequently, the amount of sodium percarbonate recovered is small, and the yield of the crystals based on hydrogen peroxide is extremely low. Various efforts have therefore been made to increase the yield of the crystals by, for example, a method which comprises salting out the dissolved sodium percarbonate by adding sodium chloride, alcohol, etc., or by evaporating the excess water under vacuum to increase the concentration of the crystals, and so on. Since, however, the amount of the water is too large, the salting-out effect is insufficient, and in industrial practice, disposal of a large amount of the excessive water in the reaction medium gives rise to a problem. When the excess water is to be removed by evaporation under vacuum, the hold-up of the reactor is increased, and the loss of hydrogen peroxide by decomposition is large. After all, the yield of the crystals based on hydrogen peroxide does not become high.

A method has also been suggested which comprises dissolving sodium carbonate in deionized water and thereafter, concentrating or cooling the solution to form sodium carbonate monohydrate or sodium carbonate decahydrate, and reacting it with hydrogen peroxide. The sodium carbonate monohydrate or decahydrate obtained by this method scarcely contains metals which may accelerate decomposition of hydrogen peroxide, and the loss of hydrogen peroxide by decomposition is small. According to this method, however, the feeding of sodium carbonate hydrate to the reaction system results in an increase of excess water in the system. Consequently, the yield of sodium percarbonate crystals is decreased because of the decrease of the concentration of the slurry containing sodium percarbonate. Particularly, the increase of the excessive water is remarkable in continuous long-period operations. Furthermore, a step of concentrating or crystallizing an aqueous solution of sodium carbonate is required so as to provide sodium carbonate monohydrate or decahydrate, and the process steps become complex. This is by no means advantageous to industrial practice.

Another method suggested in the past is to add a stabilizer as an organic chelating agent such as ethylenediaminetetraacetic acid (EDTA) or an inorganic salt such as a phosphate or silicate to the reaction system without purification of sodium carbonate or use of sodium monohydrate or sodium decahydrate. However, the conventional organic chelating agent or inorganic salt do not give entirely satisfactory results.

It is an object of this invention therefore to provide a process for producing sodium percarbonate from sodium carbonate and hydrogen peroxide while minimizing the decomposition of hydrogen peroxide without any treatment of sodium carbonate.

In order to achieve the object of the invention, the present inventors have made extensive investigations, and found a stabilizer of an organic chelating agent type which exhibits an excellent effect against decomposition of hydrogen peroxide.

According to this invention, there is provided a process for producing sodium percarbonate which comprises reacting sodium carbonate with hydrogen peroxide in a working solution consisting of sodium carbonate, hydrogen peroxide and water, said reaction being performed in the presence of at least one N,N,N',N'-tetra(phosphonomethyl)-diaminoalkane of the following formula

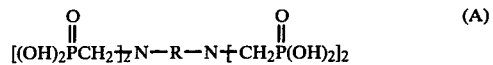

wherein R is either

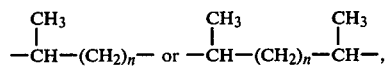

and n is 0 or 1 to 4, and at least one salt selected from the group consisting of phosphates, silicates and magnesium salts.

According to this invention, the introduction of excess of water into the reaction system, which is one cause of the decreased yield of sodium percarbonate crystals, is obviated, and the decomposition of hydrogen peroxide by metals derived from the starting sodium carbonate is fully inhibited by using a much smaller amount of the aforesaid stabilizer than known stabilizers. Hence, the yield of sodium percarbonate crystals formed on the basis of hydrogen peroxide is increased, and sodium percarbonate having excellent storage stability can be produced.

Typical examples of the N,N,N',N'-tetra(phosphonomethyl)diaminoalkane having a branched chain which is represented by the general formula (A) include N,N,N',N'-tetra(phosphonomethyl)-1,2-diaminopropane, N,N,N',N'-tetra(phosphonomethyl)-2,3-diaminobutane, N,N,N',N'-tetra(phosphonomethyl)-1,3-diaminobutane, and N,N,N',N'-tetra(phosphonomethyl)-2,4-diaminopentane. Of these, N,N,N',N'-tetra(phosphonomethyl)-1,2-diaminopropane and N,N,N',N-tetra(phosphonomethyl)-2,3-diaminobutane are preferred.

The amount of the stabilizer in accordance with this invention is 100 to 1000 ppm, preferably 100 to 500 ppm, based on the working solution. If the amount is less than 100 ppm, a sufficient effect cannot be obtained. Even if it is more than 1000 ppm, no marked effect is obtained. The N,N,N',N'-tetra(phosphonomethyl)-diaminoalkane is a known compound and can be easily obtained by adding formalin dropwise to a mixed solution of a diaminoalkane whose alkyl moiety corresponds to R in general formula (A), phosphorous acid and hydrochloric acid.

The phosphates, silicates and magnesium salts used in this invention are desirably water-soluble. Typical examples of these salts include phosphates such as monobasic sodium phosphate, dibasic sodium phosphate, tribasic sodium phosphate, monobasic potassium phosphate, dibasic potassium phosphate, tribasic potassium phosphate, sodium hexametaphosphate, sodium pyrophosphate, sodium polyphosphate and potassium pyrophosphate; silicates such as sodium silicate, lithium silicate and potassium silicate; and magnesium salts such as magnesium sulfate and magnesium chloride. These salts are used either singly or as a mixture of two or more.

The amounts of the phosphate, silicate and magnesium salt to be used in this invention are 0.1 to 2.0% by weight, preferably 0.5 to 1.0% by weight, 0.5 to 5% by weight, preferably 0.5 to 1.5% by weight, and 0.1 to 1.0% by weight, preferably 0.1 to 0.5% by weight, respectively, based on charged sodium carbonate. If the amount of the silicate is more than 5%, the storage stability of the resulting sodium percarbonate is likely to be reduced.

Usually, solid powdery sodium carbonate of industrial grade having a purity of about 99% and containing metal impurities such as iron, manganese and copper is used as the starting sodium carbonate without any pretreatment, and hydrogen peroxide is used in the form of an aqueous solution having a concentration of generally at least 35%, preferably 60 to 75%.

The ratio between the sodium carbonate and the hydrogen peroxide is such that when the composition of sodium peroxide is taken as $2Na_2CO_3 \cdot 3H_2O_2$, the hydrogen peroxide is used in an amount about 1.2 to about 2.0 times the theoretical amount.

The process of this invention can be conveniently carried out generally by preparing in a reactor a working solution containing 2.4 to 4.5% by weight of hydrogen peroxide and 9.5 to 12.4% by weight of sodium carbonate from the aforesaid industrial grade $Na_2CO_3$ and a 60% aqueous solution of $H_2O_2$, adding a predetermined amount of the N,N,N',N'-tetra(phosphonomethyl)diaminoalkane and the inorganic salt, then reacting sodium carbonate with hydrogen peroxide at a reaction temperature of 10° to 30° C., preferably 15° to 20° C. and a stirring speed of 200 to 500 rpm while adjusting the residence time of the crystal slurry to 0.5 to 1.5 hours, preferably 0.5 to 1.0 hour to crystallize sodium percarbonate, continuously withdrawing the resulting slurry from the reactor, collecting the crystals by filtration, and drying them.

The invention is not limited to the above procedure, and the reaction can also be carried out under reaction conditions known heretofore.

According to this invention, the decomposition of hydrogen peroxide can be fully inhibited even in continuous long-term operation by using a much smaller amount of the stabilizer and the salts than in the case of using a conventional stabilizer of the organic chelating agent type together with the inorganic salt. The process of the invention can thus provide sodium percarbonate having high quality and excellent storage stability in which the ratio of hydrogen peroxide to sodium carbonate in the crystals is close to the theoretical value.

The following Example illustrates the present invention more specifically.

EXAMPLE 1

A working solution containing 2.4% by weight of hydrogen peroxide and 12.1% by weight of sodium carbonate was prepared in a 500 ml reactor equipped with an agitator and thermometer. Each of the mixed stabilizers shown in Table 1 was added, and sodiumm carbonate and 60% aqueous solution of hydrogen peroxide was charged continuously at a rate of 94 g/hr and 75 g/hr, respectively, with stirring. The reaction was carried out at a temperature of 15° C. and a stirring speed of 300 rpm continuously for 5 hours while adjusting the residence time of the crystal slurry to 30 minutes. The crystal slurry was continuously withdrawn from the reactor after the lapse of a predetermined residence time. The crystal slurry was collected by filtration, and dried. The weight of the resulting crystals and the concentration of hydrogen peroxide in the crystals were measured, and the yield of crystals based on hydrogen peroxide per unit time was calculated. Separately, the resulting crystals were allowed to stand for 30 days in the open state in an atmosphere at 35° C. and 80% RH. The ratio of decomposition of hydrogen peroxide in the crystals was used as a measure of storage stability. The results are shown in Table 1.

TABLE 1

| Run No. | Stabilizer Type | Amount | Yield of crystals (5) 1 hour | 3 hours | 5 hours | Ratio of decomposition (%) |
|---|---|---|---|---|---|---|
| 1 | TPDP<br>NaH$_2$PO$_4$ | 300 ppm<br>0.5% | 92 | 94 | 96 | 10 |
| 2 | TPDB<br>NaH$_2$PO$_4$ | 300 ppm<br>0.5% | 92 | 93 | 95 | 10 |
| 3 | TPDP<br>Na$_2$SiO$_3$ | 300 ppm<br>1.0% | 90 | 93 | 95 | 11.5 |
| 4 | TPDP<br>MgSO$_4$ | 300 ppm<br>0.5% | 91 | 93 | 96 | 10.5 |
| 5 | TPDP<br>Sodium pyrophosphate | 300 ppm<br>0.3% | 90 | 92 | 95 | 11 |
| 6 | TPDP<br>NaH$_2$PO$_4$<br>MgSO$_4$ | 300 ppm<br>0.5%<br>0.3% | 90 | 94 | 95 | 7.5 |
| 7 | TPDP<br>Sodium pyrophosphate | 300 ppm<br>0.3% | 90 | 93 | 94 | 8.2 |

TABLE 1-continued

| Run No. | Stabilizer Type | Amount | Yield of crystals (5) 1 hour | 3 hours | 5 hours | Ratio of decomposition (%) |
|---|---|---|---|---|---|---|
| 8 | MgSO$_4$ | 0.3% | 89 | 94 | 94 | 9.5 |
|   | TPDB | 300 ppm | | | | |
|   | Na$_2$SiO$_3$ | 1.0% | | | | |
|   | MgSO$_4$ | 0.3% | | | | |
| 9 | TPDP | 300 ppm | 92 | 94 | 95 | 7 |
|   | NaH$_2$PO$_4$ | 0.5% | | | | |
|   | Sodium pyro-phosphate | 0.3% | | | | |
|   | MgSO$_4$ | 0.3% | | | | |
| 10 | TPDB | 300 ppm | 90 | 93 | 95 | 7 |
|   | NaH$_2$PO$_4$ | 0.5% | | | | |
|   | Sodium pyro-phosphate | 0.3% | | | | |
|   | MgSO$_4$ | 0.3% | | | | |

TPDP: N,N,N',N'-tetra(phosphonomethyl)-1,2-diaminopropane
TPDB: N,N,N',N'-tetra(phosphonomethyl)-2,3-diaminobutane

What we claim is:

1. A process for the continuous production of sodium percarbonate which consists essentially of reacting sodium carbonate with hydrogen peroxide in a working solution of sodium carbonate, hydrogen peroxide and water, said reaction being carried out in the presence of two stabilizers, one selected from the group consisting of N, N, N',N'-tetra(phosphonomethyl)diaminoalkane of the following formula

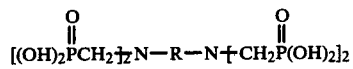

wherein R is either

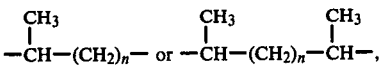

and n is 0 or 1 to 4, mixtures thereof and the other salt selected from the group consisting of phosphates, silicates and magnesium salts and mixtures thereof, wherein said N,N,N',N'-tetra(phosphonomethyl)-diaminoalkane is present in an amount of at least 100 ppm based on the working solution and wherein the phosphate, silicate or magnesium salt are added in amounts of 0.1 to 2.0% by weight, 0.5 to 5.0% by weight, or 0.1 to 1.0% by weight, respectively, based on the weight of the sodium carbonate reactant.

2. The process of claim 1 wherein the reaction is carried out at a temperature of 10° to 30° C. in the working solution, the resulting crystals of sodium percarbonate is withdrawn as an aqueous slurry from the reaction zone, and the crystals are collected by filtration and dried to recover them as a final product.

3. The process of claim 1 wherein the N,N,N',N'-tetra(phosphonomethyl)diaminoalkane is N,N,N',N'-tetra(phosphonomethyl)-1,2-diaminopropane or N,N,N',N'-tetra(phosphonomethyl)-2,3-diaminobutane.

4. The process of claim 1 wherein the N,N,N',N'-tetra(phosphonomethyl)diaminoalkane is added in an amount of 100 to 1000 ppm based on the working solution.